(12) United States Patent
Todasco et al.

(10) Patent No.: US 10,515,393 B2
(45) Date of Patent: Dec. 24, 2019

(54) IMAGE DATA DETECTION FOR MICRO-EXPRESSION ANALYSIS AND TARGETED DATA SERVICES

(71) Applicant: PAYPAL, INC., San Jose, CA (US)

(72) Inventors: Michael Charles Todasco, Santa Clara, CA (US); Akshay Sanjeevaiah Krishnaiah, Milpitas, CA (US); Megan Marie O'Neill, San Jose, CA (US); Srivathsan Narasimhan, San Jose, CA (US); Komalta Rajani, Mountain View, CA (US)

(73) Assignee: PAYPAL, INC., San Jose, CA (US)

( * ) Notice: Subject to any disclaimer, the term of this patent is extended or adjusted under 35 U.S.C. 154(b) by 566 days.

(21) Appl. No.: 15/199,516

(22) Filed: Jun. 30, 2016

(65) Prior Publication Data

US 2018/0005272 A1 Jan. 4, 2018

(51) Int. Cl.
*G06Q 30/00* (2012.01)
*G06Q 30/02* (2012.01)
*G06K 9/00* (2006.01)

(52) U.S. Cl.
CPC ..... *G06Q 30/0269* (2013.01); *G06K 9/00302* (2013.01)

(58) Field of Classification Search
None
See application file for complete search history.

(56) References Cited

U.S. PATENT DOCUMENTS

| 2013/0300900 A1* | 11/2013 | Pfister | G06K 9/00315 348/239 |
| 2014/0279056 A1* | 9/2014 | Sullivan | G06Q 30/0275 705/14.71 |

(Continued)

FOREIGN PATENT DOCUMENTS

| JP | 2011081445 A | * | 4/2011 | G06T 7/20 |
| JP | 2014056576 A | * | 3/2014 | H04L 9/3231 |

OTHER PUBLICATIONS

Vaccaro, Sydney. Fraud Caused By Drunk Shopping? (Aug. 20, 2018). Retrieved online Aug. 8, 2019. https://chargeback.com/fraud-caused-by-drunk-shopping/ (Year: 2018).*

(Continued)

*Primary Examiner* — James A Reagan
(74) *Attorney, Agent, or Firm* — Haynes and Boone, LLP

(57) ABSTRACT

There are provided systems and methods for image data detection for micro-expression analysis and targeted data services. A user may utilize a communication device, where during use of the communication device, one or more images of the user are captured by the communication device. The image(s) may be analyzed to identify at least one micro-expression of the user during use of the communication device, for example, at a time of performing online purchasing or messaging with other merchants or users. The micro-expression may then be used to determine a user state for the user at the time of use of the communication device, where an action or process may be executed with the communication device in response to the user state. In various embodiments, a service provider may be utilized to determine the user's state based on the micro-expression and execute an action based on the user's state.

20 Claims, 6 Drawing Sheets

(56) References Cited

U.S. PATENT DOCUMENTS

2017/0140376 A1* 5/2017 Carraway ............ G06Q 20/401
2017/0223017 A1* 8/2017 Kohli ............... G06Q 20/40145

OTHER PUBLICATIONS

Kunkle, Fredrick. Coming soon: If you're not sober, you won't be able to start the car. (Apr. 6, 2019). Retrieved online Aug. 8, 2019. https://www.washingtonpost.com/transportation/2019/04/06/coming-soon-if-youre-not-sober-you-wont-be-able-start-car/ (Year: 2019).*

* cited by examiner

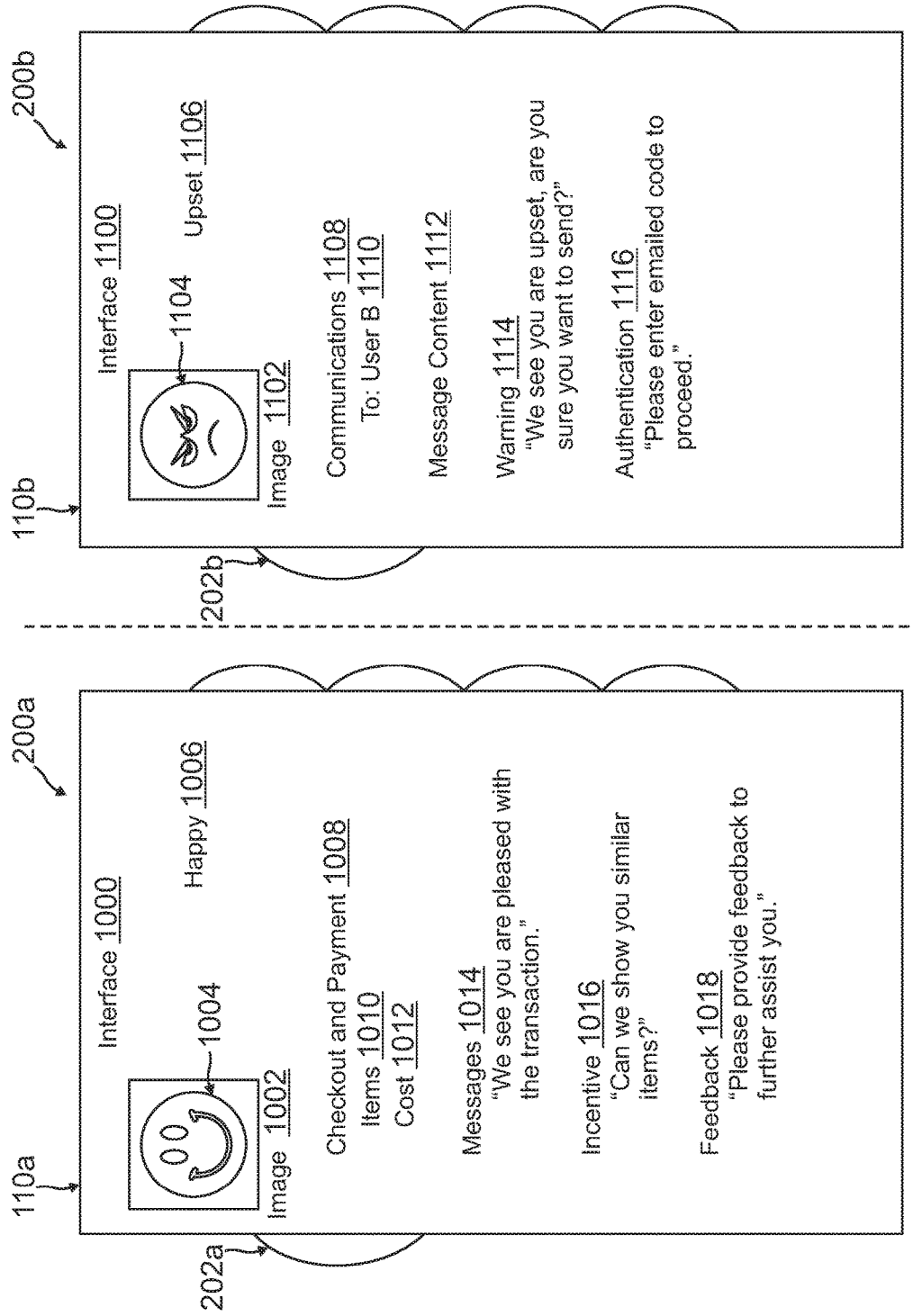

IMAGE DATA DETECTION FOR MICRO-EXPRESSION ANALYSIS AND TARGETED DATA SERVICES

TECHNICAL FIELD

The present application generally relates to facial recognition and image data analysis, and more specifically to image data detection for micro-expression analysis and targeted data services.

BACKGROUND

Users may utilize communication devices to perform various actions, including online shopping and/or purchases, as well as social networking, messaging, and other actions associated with online services. When utilizing the device, the user may have certain physical reactions or other body and/or facial motions that may indicate a user's interest in a subject, current state of mind, or other emotion while performing the actions with the communication device. Such body and/or facial motions may include micro-expressions, such as a facial tick, movement or narrowing of eyes, or other facial or body movement that indicates the user's state of mind During real-world, in person, actions between users, the users may read such micro-expressions to determine the state of mind of the other user. For example, a salesperson may view a customer's uneasiness with a purchase, such as shuffling feet, as indicating that the user is on the fence about the purchase, but unwilling to commit. In such scenarios, the salesperson may provide a further incentive to the user to complete the purchase. However, where a merchant cannot view the user, for example, during online transactions, the merchant may not know what to provide to convert the user to a customer. Moreover, the user's communication device similarly cannot execute processes as the communication device cannot determine and react to the user's state of mind.

BRIEF DESCRIPTION OF THE DRAWINGS

FIG. 2A is an exemplary graphical user interface of an application capturing a micro-expression of a user an executing a process in response to a user state associated with the micro-expression, according to an embodiment;

FIG. 2B is an exemplary graphical user interface of an application capturing a change in a micro-expression of a user an executing a process in response to a change in a user state associated with the new micro-expression, according to an embodiment;

Figure 1A:
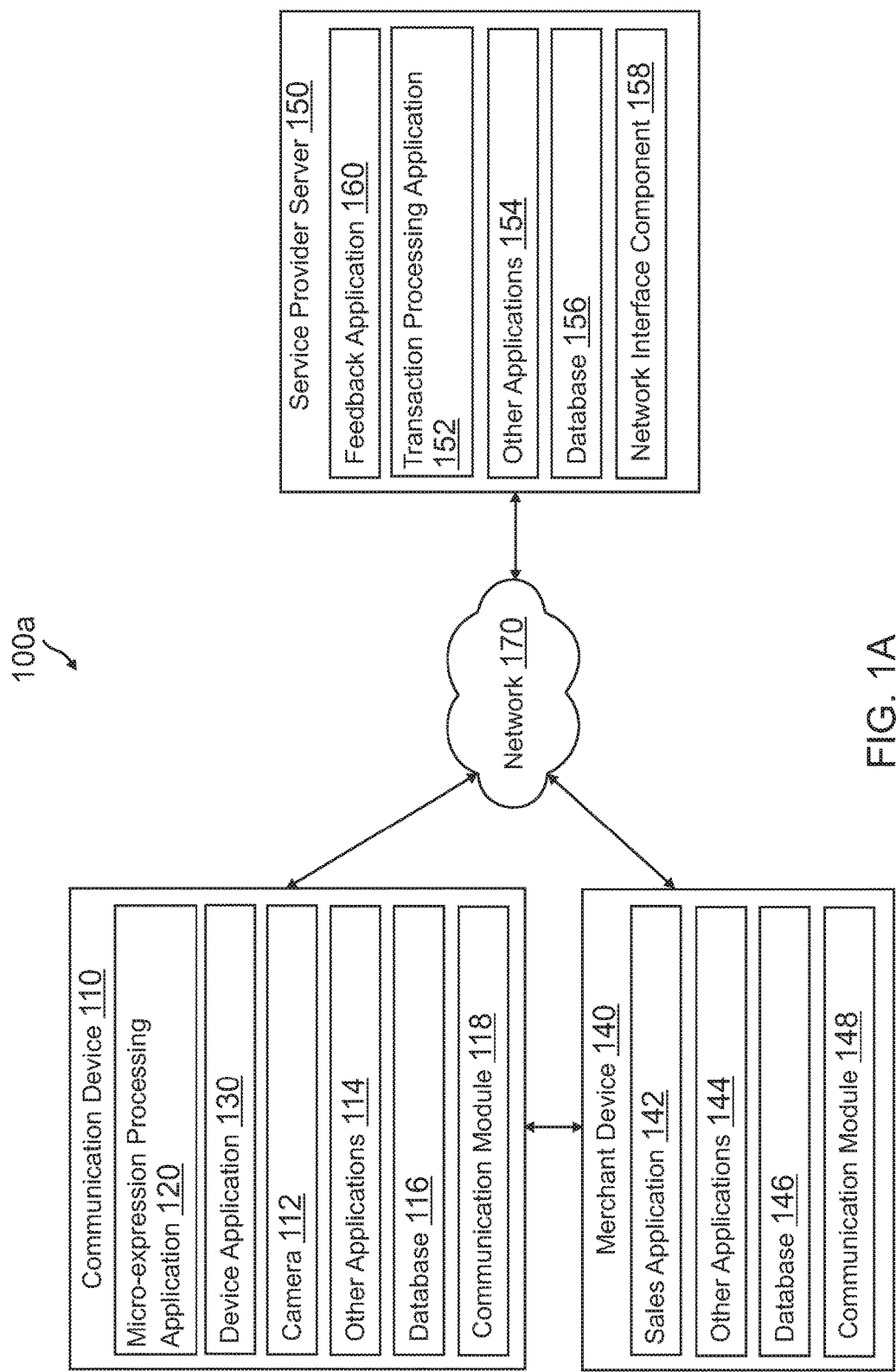
FIG. 1A is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for image data detection for micro-expression analysis and targeted data services. Systems suitable for practicing methods of the present disclosure are also provided.

Users may utilize various types of devices to capture images, including digital cameras, mobile smart phones, tablet computers, digital video recorders, gaming systems including mobile gaming systems, and other types electronic devices capable of capturing an image or video of the user. Thus, although the terms "image," "video," or the like may be used throughout, it is understood that other forms of image data may also be captured, including infrared image data, x-ray data, or other types of image data that may be detected by an imaging device, such as a camera, infrared sensor, photodetector, etc. In this regard, an image may also include a representation or likeness of a user, such as facial data and/or body data that captures all or part of the user's face and/or body states, motions, actions, and/or reactions at the time of capturing the image. For example, a user may capture the user's likeness (e.g., a "selfie") when intentionally photographing or videotaping the user (e.g., selecting an image recording application and requesting the application record the user's image). In other embodiments, the communication device may automatically record or otherwise capture/process the images, for example, on request through or detection of a process executing on the communication device and/or by a device/server of a service provider over a network connection with the communication device. Similarly, merchants, events, venues, locations, location administrators, and other entities may wish to record an image of the user. Additionally, the image may correspond to a single image, or may be part of a plurality of images, such as a video having multiple frames or still images. In various embodiments, additional information may be captured of the user, including sounds and voice cues, background or ambient noise, biometrics (e.g., fingerprint, heart rate, retinal scan), and/or biometric cues (e.g., pulse or heart rate change, blood pressure change, pupil dilation or contraction, breath change, etc.). Such additional information may be captured by a communication device, such as a mobile phone, or a connected device, such as a fitness tracker, and may be associated with the captured image(s) and/or video(s).

Thus, the user's likeness in an image may include some representation of the user that may be used to identify the user and/or determine a motion or other physical appearance, change, or action of the user that indicates an emotion, thought, or other mental or physical state of the user. Thus, the image includes an expression of the user shown through the user's facial and/or body data. The expression may correspond to a micro-expression, which may correspond to a brief, voluntary or involuntary expression shown through the user's motion, action, reaction, or other facial or body representation. The micro-expression may occur when the user has an emotional or thought response to an occurrence, such as information presented on the communication device. In other embodiments, the micro-expression may occur based on the user's current state of mind, such as a mood of a user (e.g., happy, sad, etc.), clarity of the user's thoughts (e.g., when angry, inebriated, tired, paying or not paying attention, etc.), or other current thought process of the user. Thus, the facial and/or body data in the captured media (e.g., digital media, such as a digital image or digital video) may be used to determine a current emotional state, experience, or thought process of the user. The micro-expression may therefor indicate a current state of the user, which may be consciously perceived by the user, or subconsciously performed and experienced by the user. While an image may be limited to a single micro-expression presented through the facial and/or body data from the image, a video may include a plurality of different facial data and/or body data having several different micro-expressions. Additionally, the image and/or video data may be received with additional captured data for the user by the user's communication device or another associated device, including sound data, biometric data, and/or other user information at the time of capturing the image/video.

Thus, the communication device and/or service provider may receive the image or other image data, which may be processed to determine a micro-expression of the user. The image data may be processed using facial, body, and/or object recognition, or other image processing technique to determine the micro-expression of the user in the image. The image data may be compared to other images and/or stored data of micro-expressions. For example, the facial data of the user in the image may be compared through feature comparison to other examples of micro-expressions stored to the communication device and/or server. Using such comparison, facial recognition, and/or other image processing process or features, the communication device and/or service provider may identify the micro-expression and determine what the micro-expression is or corresponds to. Thus, the communication device and/or service may have a database with stored micro-expressions and data necessary to identify the micro-expression when the user performs the micro-expression. The micro-expression may then be identified through the micro-expression information stored by the communication device and/or service provider and the facial and/or body data from the image/video of the user. Moreover, when identifying the micro-expression, the micro-expression may be associated with a current action being performed or observed by the user. For example, the facial motion, tick, reaction, or other captured feature may be associated with content that the user is viewing or consuming at the time (e.g., video watching, image viewing, etc., which may also be performed with groups of users, including movie watching and/or video conferencing), an application interaction by the user (e.g., online shopping, purchasing/payment processing, web browsing, social networking, microblogging, messaging, survey taking, online group activities including game playing and/or movie watching, etc.), or other action the user performs with the communication device. Thus, the action by the user with the communication device may be captured by the communication device at the time of capture of the image/video having the micro-expression(s) of the user. In this regard, the micro-expression may be context dependent with the action the user is performing on the communication device. For example, pursed lips while typing on a keyboard or entering input may be processed different, as discussed herein, than pursed lips while reviewing incoming messages. The communication device (or the service provider where the service provider performs micro-expression analysis and processing) may then associate and/or store the image, image data, and/or micro-expression.

Each of the stored micro-expressions may further be associated with a user state for the user performing the micro-expression. For example, the micro-expression may be associated with a state of mind, emotion, reaction, mood, thought and/or other user state of the user at the time the user performs the micro-expression. As previously discussed, the micro-expression may occur consciously or subconsciously by the user, and may indicate the aforementioned user state. The communication device and/or service provider may determine the user state as a user state associated with the micro-expression performed by the user and determined from the image data of the user. The micro-expressions and associated user states may be determined and/or entered through known micro-expressions and associated user states, for example, those determined by an administrator of the system or a psychologist trained in reading micro-expressions and determining associated user states for the read micro-expressions. Thus, the micro-expressions and associated user states may be determined from historical information on the user's and/or other users' micro-expressions and their user state at the time of performing the micro-expression. In various embodiments, the micro-expressions and/or the associated user states may also be specific to a location, nationality, ethnicity, and/or other demographic information. In this regard, different cultures may have different micro-expressions and/or user states resulting in the micro-expressions. Thus, the micro-expressions and/or user states may be culturally dependent. The demographic information may be determined through a location of the user, which may be determined through the communication device of the user, such as through GPS locators and associated technology. Additionally, the user state for one or more micro-expressions in captured image/video data may also be dependent on the additional information associated with the image/video and/or the user. For example, the user state may be determined on sound data and/or biometric data for the user at the time of the image/video. Thus, a change in heart rate or pupils, user sounds and/or ambient sounds, or other information may be used to determine what the user state is that is associated with a micro-expression.

Where the micro-expression may have multiple user states or additional information is required to determine the user state for a micro-expression, the user may be queried to provide the additional information. In order to query the user to determine the user state, a list of emojis may be presented to the user and the user may select from the list to indicate a user state. In other embodiments, the user may directly type in or provide other input to select the user state. The input may assist a machine learning system to narrow down the micro-expression for the user to a corresponding user state. Additionally, where a list of emojis or other query is presented to the user to receive user input indicating a user state for a micro-expression, multiple different instructions or messages may be communicated to the user to receive the user input. For example, a text message may state a general user state, such as "I am guessing you are puzzled, am I correct?" The message may be followed with an additional request, such as "tell me how you feel," which may be presented with the emoji list for selection through user input (e.g., mouse click, audio input, etc.). In other embodiments, the user may be asked to agree to an assessment, for example, "you look like you can use some cheer, do you agree?" where the user may agree or disagree through user input including voice input. The user input may also be detected through user motion, such as a yes or no headshake.

In such embodiments, the query may be in response to a user state that indicates another action to execute, including purchase of items.

In various embodiments, the micro-expression and user state may be user dependent. For example, facial recognition or other image processing may be utilized on the received image data to determine an identity of the user, and retrieve micro-expressions specific to that user. Thus, the user may previously register micro-expressions with the communication device and/or service provider, such as through viewing content and/or performing actions having known user states as reactions to viewing the content and/or performing the actions. The user's micro-expressions may then be viewed through an image capture device, and the micro-expressions may be then associated with each of the known user states. Thus, on detection of the user and determination of the identity of the user through the image data, the micro-expressions for the user may be retrieved, and a user state for the user may be determined through the micro-expressions and associated user states particular to the user. The user may also be identified through entered authentication credentials, entry of a name or identifier to an application, or other identification and/or authentication process.

Using the user state, an action to execute by the communication device and/or service provider may be determined. In this regard, the action may be dependent on and result from the user state determined through the micro-expression. In certain embodiments, the micro-expression may result from a transaction the user is engaged in with a merchant using the communication device, an item (e.g., a product, service, or good, referred to herein as an "item" or "items") the user is viewing for purchase on the communication device (e.g., through an online marketplace), and/or a social network site the user is viewing. In such embodiments, the micro-expression may result from viewing transaction information, such as a price of the item, item information, delivery information, or other item/merchant/transaction information. The micro-expression may also occur during purchase and/or payment processing, for example, based on viewing tax, shipping costs, financing charges, available funds, or other payment information. Thus, the user state resulting from the transaction may be determined using the micro-expression of the user. For example, if the user is happy or upset when conducting the transaction or viewing the content, the user's state may be determined through the micro-expression of the user. The user state during the transaction may be used to determine an action related to the transaction to execute with the user. For example, if the user is happy with the transaction but does not complete the transaction, a reminder may be sent to the user about the transaction in order to convert the user to a customer of the merchant by completing the transaction. Conversely, if the user is upset, angry, confused, sad, or disappointed when viewing/performing the transaction and does not complete the transaction, an incentive (e.g., discount, rebate, sale information, additional products, credit offers, etc.) may be provided to the user in order to convert the user. Other information may be provided to the user in response to the user state for the transaction, such as advertisements, customer support, item/price comparisons, available funds and/or credit, credit offers, or other information may be used to convert the user to complete the transaction. In various embodiments, the information on the user state may be provided to the merchant for the merchant to provide the aforementioned information to the user through the user's communication device. However, in other embodiments, the communication device and/or service provider may determine the additional information to provide to the user based on the state of the user.

Thus, the user state may be used to determine a process and/or information necessary to convert the user to processing and completing a transaction. The user state may be determined as described above when providing the process and/or additional information to the user to determine whether the process/information is more successful at converting the user, is undesirable to the user, or if the user does not wish to complete the transaction. The user state may also be used to adjust future transaction for the user and/or other users. For example, the user state may be used to determine an advertisement and/or advertisement campaign by determining user reactions and feelings directed to advertisements, transactions, and/or items in a transaction. For example, if a user state indicates displeasure with an advertisement or item information (which may include further performing an action indicating displeasure, such as fast-forwarding through the commercial, canceling a pop-up, etc.), advertisements and/or incentives in advertisements for the items may be changed, added, and/or removed. Similarly, item information and/or other transaction information may be adjusted based on the user's reaction to the item and/or transaction. Thus, the merchant may receive the data on user states in reaction to engaging in a transaction and/or viewing an item in order to determine how to price and/or advertise an item. The communication device and/or service provider may be required to communicate with the merchant of the user state and/or the transaction information on order to allow the merchant to provide the process/information to convert the user in the transaction, as well as update the item and/or transaction information. The information on the user state may be provided to the merchant in real-time so that the merchant may update the item and/or transaction information in real-time and attempt to convert the user prior to the user ending the transaction and/or leaving the merchant's online marketplace. Additionally, the merchant may contact, or have a salesperson contact the user, during the transaction based on the user state in order to convert the user in a transaction.

The user state may also be utilized to perform A/B testing or split testing. In this regard, groups of users may be provided with one of two or more variants of an experiment or test item to be viewed, received, interacted with, or otherwise utilized by the groups. For example, an "A" group may view one iteration of a website, an account policy, a shipping policy, or other information, while a "B" group may view a different iteration of the information. Images and/or videos of the users in each group may be captured when viewing the different iterations of the information. Based on the users' responses, a service provider utilizing or providing the information may determine user reactions, thoughts, or emotions with respect to the presented information. This may allow the service provider to make choices about the information based on user reactions, for example, which iteration of the information had the most positive user state in reaction to the information or which iteration is the most successful.

In further embodiments, the user state may be used to determine whether additional authentication is required by the user to perform actions on the communication device. For example, if the user is engaged in a transaction but the user state indicates the user is inebriated, the communication device and/or service provider may determine that additional authentication and/or user information is required to be input to the user in order to complete the transaction. The communication device and/or service provider may also display user information and/or transaction information, such as an account balance, total transaction cost, or other information that may be used to indicate that the transaction is expensive, out of the ordinary for the user, risky, or otherwise undesirable, where the user may not normally engage in the transaction in a normal or sober state of mind. Thus, the user may require payment services, for example, to provide a payment to a merchant, which may require authentication based on the user state of the user. In this regard, the user's device may further include a payment application, which may be configured to send and receive payments to another party, such as another user and/or a merchant. The payment application may be associated with a payment provider, such as PayPal® or other online payment provider service, which may provide payments and other services on behalf of user. In various embodiments, depending on the user state for the user, payment services using the payment application may be limited, prevented, hidden, or made more difficult to complete, such as hiding a payment button of the payment application if the user is inebriated.

In various embodiments, other user states may also be used to require additional authentication in order to process an action by the user using the communication device. For example, if the user is angry, inebriated, or sad, additional information may be required prior to sending any communications using a messaging platform of the communication device (e.g., text, email, instant messaging, etc.), posting to a social networking platform or interacting on the social network, posting or responding on a microblogging service, playing or interacting within a video game, or other use of a device application and/or online service of a service provider. Alternatively, the option for the user to communicate information through the platform may be blocked or inactivated. Thus, depending on the user state for the user, device functionality may be limited, hidden, or prevented. The authentication and/or information on a user state may also be utilized in real-world examples where the user is required to confirm their user state prior to authentication of the user, use of a device, object, or vehicle by the user, or other user action. For example, a user state indicating sobriety or calm emotions may be required for jobs such as air traffic controllers, pilots, public transportation drivers, truck drivers, surgeons, or other job with public safety concerns. In this regard, an system to detect a micro-expression and user state may be installed in a vehicle device or other device, which may alert users and/or prevent users from use of objects that may cause harm to others.

Similarly, the user state may be used as a factor in authenticating the user. For example, when authenticating a user for one or more of the aforementioned actions initiated, taken, and/or requested by the user on the communication device, an image, passphrase, combination of letters or symbols, question, statement or other displayed information may be presented to the user. Based on the user's responding micro-expression and associated user state, the user may be authenticated. For example, if the user has previously seen the image, passphrase, or other displayed information, the micro-expression may indicate familiarity or recognition, and the user may be authenticated. However, a new user or a different user views the displayed information, the other user's micro-expression may indicate surprise or unfamiliarity with the displayed information, thereby preventing authentication for the other user, requiring additional authentication (e.g., two or more factor authentication, entry of private data, etc.), or limiting device functionality and/or application access. Moreover, the micro-expression and/or resulting user state occurring through the viewing of and/or interaction with data displayed in a graphical user interface of the device may be sent to an entity causing the data to be displayed to receive feedback on the displayed data. For example, surveys and polls with displayed data and queries may receive the micro-expression and/or user state to determine responses to displayed data and/or adjust the displayed data accordingly. The user state may also be utilized as data to provide other entities, for example, through a real-time expression marketplace. In such embodiments, user micro-expressions and associated user states may be user to provide other entities with information that elicits that micro-expression and/or user state. For example, other entities may be interested in known what causes positive and negative reactions.

FIG. 1A is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1A may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user, a communication device 110, a merchant device 140, and a service provider server 150 in communication over a network 170. A user (not shown) may utilize communication device 110 to utilize the various features available for communication device 110, which may include processes and/or applications that may detect a micro-expression of the user for determining a user state of the user and executing a process in response to the user state. In this regard, the user state may be determined by communication device 110, and communication device 110 may execute a process, such as an authentication process or request for additional information. In other embodiments, the micro-expression and/or user state may be communicated to merchant device 140, for example, during transaction processing to incentivize the user to complete the transaction and/or for advertisements to the user or other users. Moreover, communication device 110 may communicate the micro-expression and/or user state to service provider server 150, which may determine the user state for one or more of communication device 110 and merchant device 140, or may provide additional services to the user in response to the user state of the user.

Communication device 110, merchant device 140, and service provider server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 170.

Communication device 110 may be implemented as a communication device that may utilize appropriate hardware and software configured for wired and/or wireless communication with merchant device 140 and/or service provider server 150. For example, in one embodiment, communication device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Communication device 110 of FIG. 1A contains a micro-expression processing application 120, a device application 130, a camera 112, other applications 114, a database 116, and a communication module 118. Device application 130 and other applications 114 may correspond to executable processes, procedures, and/or applications with associated hardware. In other embodiments, communication device 110 may include additional or different modules having specialized hardware and/or software as required.

Micro-expression processing application 120 may correspond to one or more processes to execute modules and associated specialized hardware of communication device 110 to provide an application to capture images of a user associated with communication device 110 using a device camera of communication device 110, such as camera 112, where micro-expression processing application 120 may provide analysis of one or more of the images to determine one or more micro-expressions of the user for further processing. In this regard, micro-expression processing application 120 may correspond to specialized hardware and/or software of communication device 110 to capture images, where the images may correspond to still images, video images, or other digital media. Micro-expression processing application 120 may provide additionally processing after capturing an image, including cropping, adjusting color/saturation/resolution, or other editing procedures. Micro-expression processing application 120 may utilize functions associated with camera 112, such as flash, zoom, image resolution, or other camera parameter. Additionally, micro-expression processing application 120 may provide for creating, accessing, and editing a library of images, such as a photo book of captured images stored in database 114. Although micro-expression processing application 120 may capture an image of a user and process the image to determine a micro-expression and/or user state for the user, in various embodiments, micro-expression processing application 120 may provide an image to service provider server 150 for processing and determination of the micro-expression, associated user state, and/or executable process in response to the user state.

In this regard, a user associated with communication device may utilize micro-expression processing application 120 with camera 112 with micro-expression processing application 120 to record a still image and/or video image containing an image the user associated with communication device 110. For example, the captured image may contain a captured portrait of the user, such as a facial image and/or full body image. Once captured, micro-expression processing application 120 may process the image to determine an identity of the user and/or a micro-expression of the user. For example, in order to determine an identity of the user, micro-expression processing application 120 may perform image analysis and processing, including facial and/or object recognition, which determines whether the user is included in the image. Such processing may utilize another image of the user to perform comparisons, or other image data used to detect whether the user is in the image. In other embodiments, the user may indicate that they are captured in the image. The image may be captured while the user is performing some task using communication device 110, such as shopping through an online marketplace for merchant device 140, viewing content over a network, sending and/or receiving electronic messages, online social networking or micro-blogging, performing other purchase and/or payment actions, or other action or task by the user using communication device 110. In various embodiments, the user may request the image having the micro-expression is captured. However, in other embodiments, the image may be captured automatically, for example, during the task based on an application process of micro-expression processing application 120 and/or based on a request by merchant device 140 and/or service provider server 150.

If the user is detected in the image by micro-expression processing application 120, micro-expression processing application 120 may utilize similar image processing to determine a micro-expression of the user in the image. For example, database 116 and/or service provider server 150 may include data used to detect a plurality of micro-expressions for the user, which may be user specific (e.g., based on past read/detected micro-expressions of the user) or general (e.g., based on a group of users, which may be limited to nationality, ethnicity, etc., or may be general all users). The micro-expression may be detected by comparing the image of the user to data for the stored micro-expression, such as facial features (e.g., eyes, nose, mouth, eyebrows, lips, cheeks, muscles, etc.), twitches, movements, motions, actions, placement of facial features, and/or other visual appearance of the facial features of the user. In further embodiments, similar information about the visual appears of the user's body may be used. Thus, the micro-expression of the user may be determined by micro-expression processing application 120 through comparison and/or processing of the user's facial and/or body image data in the image to the data for the known micro-expressions stored by database 116 and/or service provider server 150.

Once a micro-expression is determined for the user in an image, micro-expression processing application 120 may further determine a user state for the micro-expression. Database 116 and/or service provider server 150 may include user states associated with the different micro-expressions and/or micro-expression data used to identify micro-expressions. For example, a user state may correspond to a user emotion, feeling, state of mind, or other conscious or subconscious thought process of the user. Thus, a user state may correspond to "happy," "sad," "angry," "confused," "preoccupied," "sober," "inebriated," "confused," "unlikely to purchase," "uninterested," "likely to purchase," or other user state. Each user state may be associated with one or more micro-expression, where display of the micro-expression (either consciously or subconsciously) indicates that the current user state of the user is the user state associated with the displayed micro-expression of the user. Thus, the user state may be determined through a reference table of micro-expressions to associated user states at the time of display of the micro-expressions, for example, a database table including referential data to each displayed micro-expression. As previously discussed, the processing of the image to determine the micro-expression and user state may be performed by micro-expression processing application 120, for example, using data available from database 116 and/or service provider server 150, or the image may be communicated to service provider server 150 for processing. Once the user state is determined, one or more of device application 130, merchant device 140, and/or service provider server 150 may be utilized to execute a process in response to determining the current user state of the user at the time of capture of the image. The determination of the current user state of the user may occur substantially in real-time to provide feedback, actions, and executable device processes to the user at the time the user is experiencing the user state associated with the user's displayed micro-expression. The user state may also be determined based on additional information, including time of day, biometrics, and/or sound. In this regard, the user state may also be based on past user states, which may be used to determine patterns (e.g., always grumpy at 7:00 AM). Additionally, the user state may be provided to one or more service providers and/or determined by the service providers for groups of users to aggregate user states in response to some stimuli. For example, micro-expressions and resulting user states may be determined for a crowd of movie watchers.

Device application 130 may correspond to one or more processes to execute modules and associated devices of communication device 110 to execute an application and associated processes of communication device 110, which may include processes executed in response to determine a current user state of a user associated with communication device 110 from a micro-expression of the user captured by micro-expression processing application 120 with camera 112. In this regard, device application 130 may correspond to specialized hardware and/or software utilized by communication device 110 to execute a device application, which may be utilized to perform various online and/or virtual actions, including electronic transaction processing (e.g., payments, transfers, and/or withdrawals), messaging, merchant shopping and purchasing, social networking, and other types of electronic actions. For example, device application 130 may correspond to messaging applications (e.g., email, SMS/MMS, instant messaging, and/or social networking messaging), Internet browsers (e.g., browser histories and online interactions), Internet search engines, social networking applications, microblogging applications, merchant and shopping applications, travel applications (e.g., travel fare reservation and purchasing applications including air travel, as well as local travel applications for utilizing subways, taxis, car rentals, and other transportation local to the user), mapping applications, virtual reality applications associated with a virtual reality device, or other types of device applications. Device application 130 may correspond to media viewing/sharing applications, video games, word processors and associated applications, and/or other types of modules, processes, and applications. Device application 130 may also correspond to an application for biometrics, exercise data, and/or nutritional information, which may be input by the user and/or captured with the assistance of a connected device, such as a pedometer and/or heart rate monitor (e.g., a FITBIT® or similar device using a short range wireless communication with communication device 110). Device application 130 may interface with micro-expression processing application 120 and/or service provider server 150 to receive a user state and/or executable process affecting one or more of the application and/or application features or processes of device application 130. Device application 130 may also utilize one or more components of communication device 110 to receive additional data, including sound waves, light detection, and/or other communication signals.

For example, in certain embodiments, the user state may be utilized during an authentication request. For example, device application 130 may present information to the user of communication device 110 through an output device of communication device 110 (e.g., audio, visual, and/or audio-visual content). Device application 130 may request micro-expression processing application 120 capture an image of the user during presentation of the information, and may utilize the user state to determine whether the user is familiar with the information, is viewing the information for the first time, or has the same reaction to the information. If device application 130 receives a user state that indicates the user is familiar with the information or a user state expected or known for the user, device application 130 may authenticate the user. Where device application 130 indicates that the user state does not match an expected or known user state for the user, device application 130 may not authenticate the user, or may reduce device and/or application functionality, or encrypt sensitive or confidential information.

In further embodiments, device application 130 may request that micro-expression processing application 120 determine a user state for the user to determine whether the user requires additional authentication when executing a process of device application 130. For example, if a detected user state for the user during use of a process or feature of device application 130 indicates a user state that may lead to poor decision making (e.g., inebriated, angry, sad, distracted, etc.), device application 130 may require further authentication before allowing the user to use such processes or features, for example, two or more factor authentication in the case of purchases, transfers, withdrawals and/or payments in a payment application. Similarly, communication application processes (e.g., email, text, instant messaging, social networking, media sharing, microblogging, etc.) may also require additional authentication where the user state for the user indicates a potential for poor decision making. In other embodiments, device application 130 may instead display warnings and/or additional information to the user so that the user may be aware of the application processes the user is about to initiate and/or execute. Similarly, if the user state indicates that the user is interested, paying attention, or otherwise capable of making good (e.g., informed or unimpaired) decisions, additional authentication and/or warnings may be removed or lowered, or required authentication and/or warnings may be removed or lowered. Device application 130 may also provide a user state determined by micro-expression processing application 120 during a task or process utilized by the user of communication device 110 to merchant device 140 and/or service provider server 150 for processing. For example, merchant device 140 may utilize such a user state for incentivizing the user in a transaction viewed and/or initiated by the user in device application 130 or to advertise more appropriately to the user based on the user state. Similarly, service provider server 150 may utilize the user state to provide information to the user in conformity with the task of the user in device application 130, for example, in response to a social networking action, microblogging action, media viewing and/or sharing action, video game action or play through, survey or test taking response, etc.

Camera 112 corresponds to an optical device of communication device 110 enabling a user associated with communication device 110 to capture or record images, including still and/or video images. Camera 112 may correspond to a digital camera on communication device 110, or may more generally correspond to any device capable of capturing or recording an image, video, or other digital media with the capability to capture a micro-expression of a user, including infrared imaging or other types imaging devices. Camera 112 may include various features, such as zoom, flash, focus correction, shutter speed controls, or other various features usable to capture one or more images of the user and/or other users or objects. Camera 112 may further display a preview and/or captured image to the second user through another device of communication device 110, such as a viewfinder, screen (e.g., mobile phone screen), or other display. Camera 112 may interface with one or more applications of communication device 110 for the purposes of capturing images having a micro-expression of the user associated with communication device 110, for example, during use of one or more processes of communication device 110 by the user.

In various embodiments, communication device 110 includes other applications 114 as may be desired in particular embodiments to provide features to communication device 110, for example, those applications, processes, and/or features that may not be provided by one or more of micro-expression processing application 120 and/or device application 130. For example, other applications 114 may include security applications for implementing client-side security features, programmatic client applications for interfacing with appropriate application programming interfaces (APIs) over network 170, or other types of applications. Other applications 114 may also include email, texting, voice and IM applications that allow a user to send and receive emails, calls, texts, and other notifications through network 170. In various embodiments, other applications 114 may include financial applications, such as banking applications. Other applications 114 may also include other location detection applications, which may be used to determine a location for the user, such as a mapping, compass, and/or GPS application, which can include a specialized GPS receiver that obtains location information for communication device 110 and processes the location information to determine a location of communication device 110 and the user. Other applications 114 may include social networking applications, media viewing, and/or merchant applications. Other applications 114 may include device interfaces and other display modules that may receive input from the user and/or output information to the user. For example, other applications 114 may contain software programs, executable by a processor, including a graphical user interface (GUI) configured to provide an interface to the user. Other applications 114 may therefore use devices of communication device 110, such as display devices capable of displaying information to users and other output devices.

Communication device 110 may further include database 116 stored to a transitory and/or non-transitory memory of communication device 110, which may store various applications and data and be utilized during execution of various modules of communication device 110. Thus, database 116 may include, for example, identifiers such as operating system registry entries, cookies associated with device application 130 and/or other applications 114, identifiers associated with hardware of communication device 110, or other appropriate identifiers, such as identifiers used for payment/user/device authentication or identification, which may be communicated as identifying communication device 110 to service provider server 150. Database 116 may include one or more images of a user associated with communication device 110, as well as information determined from an image, such as a micro-expression, associated user state, and/or executable process in response to the determined user state.

Communication device 110 includes at least one communication module 118 adapted to communicate with merchant device 140 and/or service provider server 150. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using short range communications, such as Bluetooth Low Energy, LTE Direct, WiFi, radio frequency, infrared, Bluetooth, and near field communications.

Merchant device 140 may be maintained, for example, by a merchant that provides electronic sales to users through communication device 110, telecommunication carrier server 130, and/or service provider server 150. In this regard, merchant device 140 may include a device having processing applications, which may be configured to interact with communication device 110 to engage in transactions. Merchant device 140 may be implemented using any appropriate hardware and software configured for wired and/or wireless communication with communication device 110 and/or communication device 130. For example, in one embodiment, merchant device 140 may be implemented as a single or networked personal computer (PC), a smart phone, laptop computer, wearable computing device, and/or other types of computing devices at a merchant location capable of transmitting and/or receiving data. Although only one merchant device is shown, a plurality of merchant devices may function similarly.

Merchant device 140 of FIG. 1A contains a sales application 142, other applications 144, a database 146, and a communication module 148. Sales application 142 and other applications 144 may correspond to processes, procedures, and/or applications executable by a hardware processor, for example, a software program. In other embodiments, merchant device 140 may include additional or different modules having specialized hardware and/or software as required.

Sales application 142 may correspond to one or more processes to execute modules and associated specialized hardware of merchant device 140 that provide sales, checkout, and payment processes for a transaction to purchase one or more items for sale from a user, such as a merchant or seller, corresponding to merchant device 140. In this regard, sales application 142 may correspond to specialized hardware and/or software of merchant device 140 to provide a convenient interface to permit a seller to enter, view, and/or edit items and/or services for purchase by the buyer associated with communication device 110. For example, sales application 142 may be implemented as an application having a user interface enabling the seller to enter item information and request payment for a transaction on checkout/payment of one or more items/services. In certain embodiments, sales application 142 may correspond more generally to a web browser configured to provide information over the Internet, for example, by hosting a website or online marketplace corresponding to the merchant and/or communicating information to another online marketplace utilized by the merchant or seller. Thus, sales application 142 may provide item sales through an online marketplace using the website of the merchant or another service provider. Thus, the user associated with communication device 110 may initiate a transaction using sales application 142, where transaction processing may occur through interfacing between communication device 110 and merchant device 140. Thus, item sales and/or transaction information may be communicated to communication device 110, where the user associated with communication device 110 may view and interact with the information, and have a user response to the information.

Thus, the user may display a micro-expression captured by communication device 110 while viewing and/or interacting with the information, as discussed herein. Thus, sales application 142 may receive a user state determined from the micro-expression, and may adjust the item sales and/or transaction information in response to the user state, or may provide targeted advertisements to the user in response the user state including changing advertisements the user views and/or other users view. For example, where the user state for the user during viewing and/or interacting with item sales information (e.g., item description, price, inventory, incentives, advertisements, delivery, etc.) or transaction information (e.g., transaction cost, delivery terms, tax, incentives, merchant information/terms, insurance, etc.) indicates that the user will not likely purchase one or more items or complete the transaction, sales application 142 may communicate with the user through communication device 110 to provide additional incentives or request information on changes in item sales/transaction information to complete the purchase/transaction. In further embodiments, sales application 142 may provide live assistance (e.g., a real salesperson through device messaging, phone call, etc.) or a virtual salesperson to discuss the item/transaction and determine how to convert the user (e.g., complete the purchase/transaction). Thus, the user state of the user may be used by sales application 142 to determine information necessary to convert the user and complete a transaction, where the information is communicated to the user through communication device 110. In various embodiments, the user state for the user may also be used to determine an overall advertisement campaign for the merchant associated with merchant device 140 and/or for one or more items offered by the merchant, or may be used to determine global and/or particular item prices, incentives, item information, distribution, or other sales and/or merchant information.

Once a payment amount is determined for a transaction for items to be purchased by user, sales application 142 may request payment from the user associated with communication device 110 for transaction processing. Payment may be provided through a payment instrument. In various embodiments, a user state may be determined during payment request and/or provision of a payment instrument. In such embodiments, sales application 142 may provide alternative payment options, such as a payment plan, extendable credit, or reduce transaction cost (e.g., rebates, discounts, etc.), for example, where the user state indicates that the user is unhappy with the transaction or may not complete the transaction. The provided and/or accepted payment information may be communicated to merchant device 140, which may be used with the transaction and transaction information for approval. Sales application 142 may then receive the results of the transaction processing, and complete the transaction with the buyer, for example, by providing the user the items for the transaction or declining the transaction where the user is not authenticated or the transaction is not authorized (e.g., insufficient funds, rejection of the transaction based on risk analysis, etc.). Sales application 142 may receive a payment notification from service provider server 150, including the payment value. A transaction history may then be generated by sales application 142 and provided to one or more of communication device 110 and/or service provider server 150.

Merchant device 140 includes other applications 144 as may be desired in particular embodiments to provide features to merchant device 140. For example, other applications 144 may include security applications for implementing client-side security features, programmatic client applications for interfacing with appropriate application programming interfaces (APIs) over network 180, or other types of applications. Other applications 144 may also include email, texting, voice and IM applications that allow a user to send and receive emails, calls, texts, and other notifications through network 180. In various embodiments, other applications 144 may include financial applications, such as banking, online payments, money transfer, or other applications associated with communication device 130. Other applications 144 may contain software programs, executable by a processor, including a graphical user interface (GUI) configured to provide an interface to the user.

Merchant device 140 may further include database 146 which may include, for example, identifiers such as operating system registry entries, cookies associated with sales application 142 and/or other applications 144, identifiers associated with hardware of merchant device 140, or other appropriate identifiers, such as identifiers used for payment/user/device authentication or identification. Identifiers in database 146 may be used by a payment/credit provider to associate merchant device 140 with a particular account maintained by the payment/credit provider. Database 146 may further include transaction information and/or results, including received user states and information to provide a user in response to the user states.

Merchant device 140 includes at least one communication module 148 adapted to communicate with communication device 110 and/or service provider server 150. In various embodiments, communication module 148 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 150 may be maintained, for example, by an online service provider, which may provide token generation and/or distribution (e.g., token transmission/broadcasting) services, as well as payment services, to one or more users. In this regard, service provider server 150 includes one or more processing applications which may be configured to interact with communication device 110, merchant device 140, and/or another device/server to facilitate connecting users having a shared interest. In one example, service provider server 150 may be provided by PAYPAL®, Inc. of San Jose, Calif., USA. However, in other embodiments, service provider server 150 may be maintained by or include another type of service provider, which may provide the aforementioned services to a plurality of users.

Service provider server 150 of FIG. 1A includes a feedback application 160, a transaction processing application 152, other applications 154, a database 156, and a network interface component 158. Transaction processing application 152 and other applications 154 may correspond to executable processes, procedures, and/or applications with associated hardware. In other embodiments, service provider server 150 may include additional or different modules having specialized hardware and/or software as required.

Feedback application 160 may correspond to one or more processes to execute software modules and associated specialized hardware of service provider server 150 to receive at least a user state of a user associated with communication device 110 based on a micro-expression of the user and provide feedback to one or more of communication device 110, merchant device 140, and/or another entity in response to the user state of the user. In this regard, transaction processing application 152 may correspond to specialized hardware and/or software to first receive a user state of the user. For example, feedback application 160 may receive the user state of the user associated with communication device 110 while the user is performing some task or action on communication device 110, or is executing some process or initiating a command using communication device 110. During said task, communication device 110 may provide the user state to service provider server 150. Feedback application 160 may determine a process to execute with communication device 110, merchant device 140, and/or another entity based on the received user state and the task of the user at the time of detection of the user state. For example, if the task includes shopping with a merchant associated with merchant device 140, service provider server 150 may provide the user state to merchant device 140 to incentivize the user in a transaction to complete the transaction (e.g., convert the user) or provide advertisements to the user based on the user state. In this regard, the user state may indicate that the user may not complete the transaction, and therefore, service provider server 150 may provide the user state to merchant device 140 to allow the merchant associated with merchant device 140 to attempt to convert the user or advertise to the user.

In other embodiments, the task may correspond to another device process, such as social networking, media viewing/sharing, microblogging, test/survey taking, etc. Thus, service provider server 150 may provide the user state in response to information displayed during the task or execution of the task to the entity administering the task to allow the entity to adjust their processes, content, and/or information in response to the tasks (e.g., removing processes, content, and/or information having a negative reaction by users, and adding or promoting the aforementioned material where the users, including test users to new material, have a positive reaction). As discussed herein, one or more of the features of micro-expression processing application 120 and/or device application 130 may be provided and/or processed by feedback application 160, such as image processing to determine a micro-expression of a user in an image, determination of an associated user state with the micro-expression, and/or determination of a process to execute on communication device 110 in response to the user state of the user in the image captured by the user.

Transaction processing application 152 may correspond to one or more processes to execute software modules and associated specialized hardware of service provider server 150 to provide payment services to users, for example though a payment account and/or payment instruments, which may include payment during transaction processing. In this regard, transaction processing application 152 may correspond to specialized hardware and/or software to provide payment services and payment accounts, including digital wallets storing payment instruments. The payment services may allow for a payment by a user to another user or merchant through a payment instrument, including a credit/debit card, banking account, payment account with service provider server 150, and/or other financial instrument. In order to establish a payment account for a user to send and receive payments, transaction processing application 152 may receive information requesting establishment of the payment account. The information may include user personal and/or financial information. Additionally, the information may include a login, account name, password, PIN, or other account creation information. The user may provide a name, address, social security number, or other personal information necessary to establish the account and/or effectuate payments through the account. Transaction processing application 152 may further allow the user to service and maintain the payment account, for example, by adding and removing payment instruments. Transaction processing application 152 may be used to determine a current task that a user associated with communication device 110 is performing or initiating, such as transaction processing with another user or merchant. Thus, transaction processing application 152 may be utilized as a trigger to cause communication device 110 to capture an image of the user, where the image is utilized to determine a micro-expression and current user state for the user during the task. In order to perform transaction processing and/or payments, transaction processing application 152 may debit an account of the user and provide the payment to an account of the merchant or other user. Transaction processing application 152 may also be used to provide transaction histories for processed transactions.

In various embodiments, service provider server 150 includes other applications 154 as may be desired in particular embodiments to provide features to service provider server 150. For example, other applications 154 may include security applications for implementing server-side security features, programmatic client applications for interfacing with appropriate application programming interfaces (APIs) over network 170, or other types of applications. Additionally, other applications 154 may include one or more applications, which may provide the features and/or service described in reference to micro-expression processing application 120 and/or device application 130 of communication device 110, such as determination of a micro-expression and/or user state, as well as provide processes for tasks executed by a user, which may be utilized as a trigger to cause capturing of a micro-expression. Other applications 154 may contain software programs, executable by a processor, including a graphical user interface (GUI), configured to provide an interface to the user when accessing service provider server 150, where the user or other users may interact with the GUI to more easily view and communicate information. In various embodiments, other applications 154 may include connection and/or communication applications, which may be utilized to communicate information to over network 170.

Additionally, service provider server 150 includes database 156. As previously discussed, a user may establish one or more digital wallets and/or payment accounts with service provider server 150. Digital wallets and/or payment accounts in database 156 may include user information, such as name, address, birth date, payment instruments/funding sources, additional user financial information, user preferences, and/or other desired user data. Users may link to their respective digital wallets and/or payment accounts through an account, user, and/or device identifier. Thus, when an identifier is transmitted to service provider server 150, e.g., from communication device 110, one or more digital wallets and/or payment accounts belonging to the users may be found. Database 156 may also store received images, determined micro-expressions, associated user states, and/or processes to execute in response to the user states.

In various embodiments, service provider server 150 includes at least one network interface component 158 adapted to communicate communication device 110 and/or merchant device 140 over network 170. In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 170 may be implemented as a single network or a combination of multiple networks. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 1B:
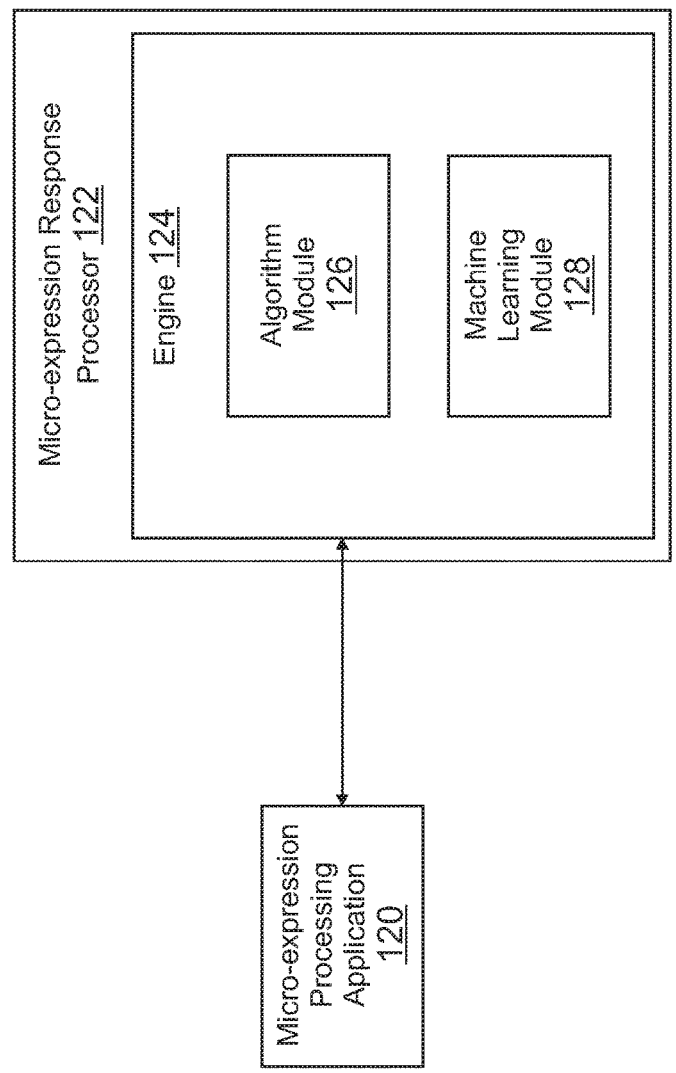
FIG. 1B is a block diagram of a micro-expression response processor component for implementing the processes described herein, according to an embodiment.

FIG. 1B is a block diagram of a micro-expression response processor component for implementing the processes described herein, according to an embodiment. In this regard, environment 100b includes micro-expression processing application 120 corresponding generally to the specialized hardware and/or software modules and processes described in reference to FIG. 1A. In this regard, micro-expression processing application 120 may be in communication with a micro-expression response processor 122, which may correspond to an internal component or module of micro-expression processing application 120 and/or a server or other device or application in communication with micro-expression processing application 120.

Micro-expression response processor 122 may correspond to a server, such as a device or application, which may be utilized to determine a micro-expression performed by a user, for example, through matching and/or scoring the user's body or facial image or video data against known micro-expression data, as well as receive input from an agent or administrator of micro-expression response processor 122 to learn over time which micro-expression is performed by the user (and/or other users) and what action should result from performance of the micro-expression by a user. For example, an engine 124 of micro-expression response processor 122 uses machine learning and artificial intelligence techniques, in some embodiments, that provide accurate determination of a micro-expression of a user through processing, matching, and/or scoring image data and/or video data of a user in response to the user performing, action or viewing content, or otherwise reacting to an occurrence. (Note that as used herein, the term "engine" refers simply to executable program instructions and/or machines that perform one or more described tasks as described herein, and is not intended to imply any specific limitations relative to other possible external uses of this term.)

In this regard, engine 124 includes an algorithm module 126 and a machine learning module 128. Algorithm module 126 comprises program instructions that are executable to determine a micro-expression performed by a user, for example, by analyzing captured image data of the user in response to some occurrence against known micro-expression data, such as known facial features during performance of a micro-expression. Accordingly, algorithm module 126 may give different weighting to various items, features, and/or information in the image/video data of the user and the known micro-expression data. Algorithm module may take captured image/video data of the user performing a micro-expression, for example, in response to some stimulus or occurrence, and score the image/video data against data for the user or other users performing micro-expressions to determine a micro-expression that the user is performing, as discussed herein. In this regard, the scoring may be dependent on the different weights, for example, providing similarities of differences between motions or placements eyes and mouth a 75% weight, while similarities and/or differences between motions or placements of eyebrows and forehead are provided a smaller weight, such as 25% or less. Algorithm module 154 may provide additional analysis of the captured micro-expression to determine a user state, including analysis of the micro-expression and associated occurrence or stimulus causing the micro-expression, and weights applied to the various input for the micro-expression. Once a micro-expression and/or user state is determined, algorithm module 154 may determine provide the input to one or more additional application to determine an action to execute in response to the user performing the micro-expression and having a user state, or algorithm module 154 may determine the action.

Note that while some discussion herein describes determining a micro-expression and associated user state of the user in response to a stimulus or occurrence provided to the user, engine 124 may generally determine a micro-expression and/or user state generally and not in response to output stimuli or occurrences. Thus, the micro-expression of the user may be determined as the user attempts to perform some action, such as purchases through a device application. In this regard, algorithm module 126 may further include algorithms and/or processes to determine when determination of a micro-expression of the user is required. For example, algorithm module 126 may further process information of actions the user is attempting to perform, such as purchases and transaction processing with a device application. Thus, algorithm module 126 may determine, based on transaction cost or risk, when a micro-expression of the user should be determined in order to provide additional transaction security or prevention of unwanted transactions. Similar processes may also occur with other device application actions, such as messaging or social networking.

Machine learning module 128 may receive any or all of the data that is input to algorithm module 126, and may update algorithm module 126 based on this and other data received subsequent to determination of the user's micro-expression and associated user state. Thus, another input to machine learning module 128 is determined micro-expression and user state. Broadly, machine learning module 128 is capable of taking micro-expression and/or user state, as well as occurrences or stimuli causing the micro-expression and resulting device actions performed as a result of the micro-expression, and then based on subsequent information, determining if that micro-expression, user state, and/or resulting action was accurate. Based on this feedback mechanism, algorithm module 126 is updated so that as time goes on, determination of a micro-expression, associated user state, and executed device action or process become increasingly precise and relevant. Accordingly, in one embodiment, engine 124 is updated with details regarding a first micro-expression, user state, and device action, as well as details of one or more subsequent micro-expressions, user states, and/or device actions.

Machine learning module 128 may therefore first obtain a predicted micro-expression, user state, and device action, then analyze a variety of micro-expressions, user states, and device actions in the future. For example, machine learning module 128 may process one or more incorrect micro-expression analysis that occur when a user performs a micro-expression in response to a stimulus, but algorithm module 126 determines an incorrect micro-expression, user state, and/or device action from the image/video data of the user performing the micro-expression. Trained human agents may be invoked to provide information on what is a correct micro-expression from the image/video data, as well as a correct user state and device action or process to execute in response to the user state. Thus, the agent may assist in adjusting known micro-expressions, weighted features, match scoring, or other data point to aid in machine learning module 128 tuning for the process to determine micro-expressions and user states in algorithm module 126. The agents may view the incorrectly processed micro-expressions, user states, and/or device actions in image/video data in order to correct micro-expression determination processes using image/video data of a user performing a micro-expression through machine learning module 128. In this regard, a smart tightening process of machine learning module 128 may be used where decisions made in the matching algorithm are based on a finer granularity of vector analysis in the image/video data, requiring more pixels or higher fidelity in visual data, and/or utilizing more points of interest in the visual data (e.g., additional feature analysis of facial and/or body visual data). Additionally, selective high risk tightening processes of machine learning module 128 may be implemented to increase device application use and/or user device action security, for example, where a transaction may have high risk or where a message may be sent incorrectly or impulsively. In such embodiments, once a pattern of messaging and/or transaction processing is established, high risk and low risk transactions or messages may be determined, which may be based on factors such as transaction cost, time of transaction/message, content of transaction/message, other entity in the transaction/message or other information. In this regard, high risk characteristics of the transaction or message (e.g., high transaction cost or dangerous message content) can be subject to more computational complexity by requiring specific user states (e.g., sober, not angry, awake, etc.) based on requirements set by the agent.

FIG. 2A is an exemplary graphical user interface of an application capturing a micro-expression of a user an executing a process in response to a user state associated with the micro-expression, according to an embodiment. Environment 200a includes a communication device 110a corresponding generally to the described features, processes, and components of communication device 110 in environment 100a of FIG. 1A. In this regard, a user 202a utilizing communication device 110a may view an interface 1000 on communication device 110, where interface 1000 provides detection of a micro-expression and execution of an action in response to the micro-expression, for example, those features and processes provided by one or more of micro-expression detection application 120 and/or device application 130 of communication device 110 in environment 100a of FIG. 1A.

In this regard, interface 1000 includes an image 1002 of a user having captured image data, such as facial data 1004. Image 1002 may correspond to a captured image of user 202a while utilizing communication device 110a. Although image 1002 is displayed in environment 200a, in other embodiments, image 1002 may not be displayed, as well as other image processing information, such as a detected micro-expression and/or user state. However, in environment 200a, a user state is shown as happy 1006 based on facial data 1004. Using the user state, happy 1006, an application associated with interface 1000 displayed on communication device 110a may execute a process in response to detecting happy 1006.

For example, user 202a may be viewing checkout and payment information 1008 in interface 1000 when happy 1006 is detected for user 202a. For example, happy 1006 may occur in user 202a and be detected in image 1002 in response to one or more of items 1010 and/or cost 1012 for checkout and payment information 1008. Thus, happy 1006 may be communicated to a merchant, where the merchant may provide one or more of messages 1014, incentive 1016, and/or feedback request 1018 to communication device 110a for display in interface 1000. For example, messages 1014 include a message of: "We see you are pleased with the transaction." Thus, incentive 1016 may display: "Can we show you similar items?" Additionally, the merchant may wish to utilize the user state of happy 1006 based on items 1010 and/or cost 1012 to adjust merchant practices, advertisements, and/or item information. Thus, the merchant may provide feedback request 1018 in interface 1000, where feedback request 1018 displays: "Please provide feedback to further assist you."

FIG. 2B is an exemplary graphical user interface of an application capturing a change in a micro-expression of a user an executing a process in response to a change in a user state associated with the new micro-expression, according to an embodiment. Environment 200b includes a communication device 110b corresponding generally to the described features, processes, and components of communication device 110 in environment 100a of FIG. 1A. In this regard, a user 202b utilizing communication device 110b may view an interface 1100 on communication device 110, where interface 1100 provides detection of a micro-expression and execution of an action in response to the micro-expression, for example, those features and processes provided by one or more of micro-expression detection application 120 and/or device application 130 of communication device 110 in environment 100a of FIG. 1A.

In this regard, as shown in environment 200b, interface 1100 includes an image 1102 captured of user 202b during use of communication device 110b, for example, during execution of a task or process associated with interface 1100. In this regard, image 1102 includes facial data 1104, where facial data 1104 may be used to determine a micro-expression of user 202b during use of communication device 110b. Further, using the micro-expression, it may be determined that facial data 1104 is associated with a user state of upset 1106. For example, upset 1106 may be in response to communications 1108 displayed in interface 1100. Communications 1108 may further include a "to:" field, for example, to user B 1110. Thus, upset 1106 may correspond to a user state while user 202b is sending message content 1112 to user B 1110. In response to the user state of upset 1106, communication device 110b may execute a process to provide warning 1114, which states: "We see you are upset, are you sure you want to send?" Moreover, communication device 110b may further require authentication 1116 to send message content 1112, which further states: "Please enter emailed code to proceed." Thus, communication device 110b may require additional factor authentication to send message content 1112.

Figure 3:
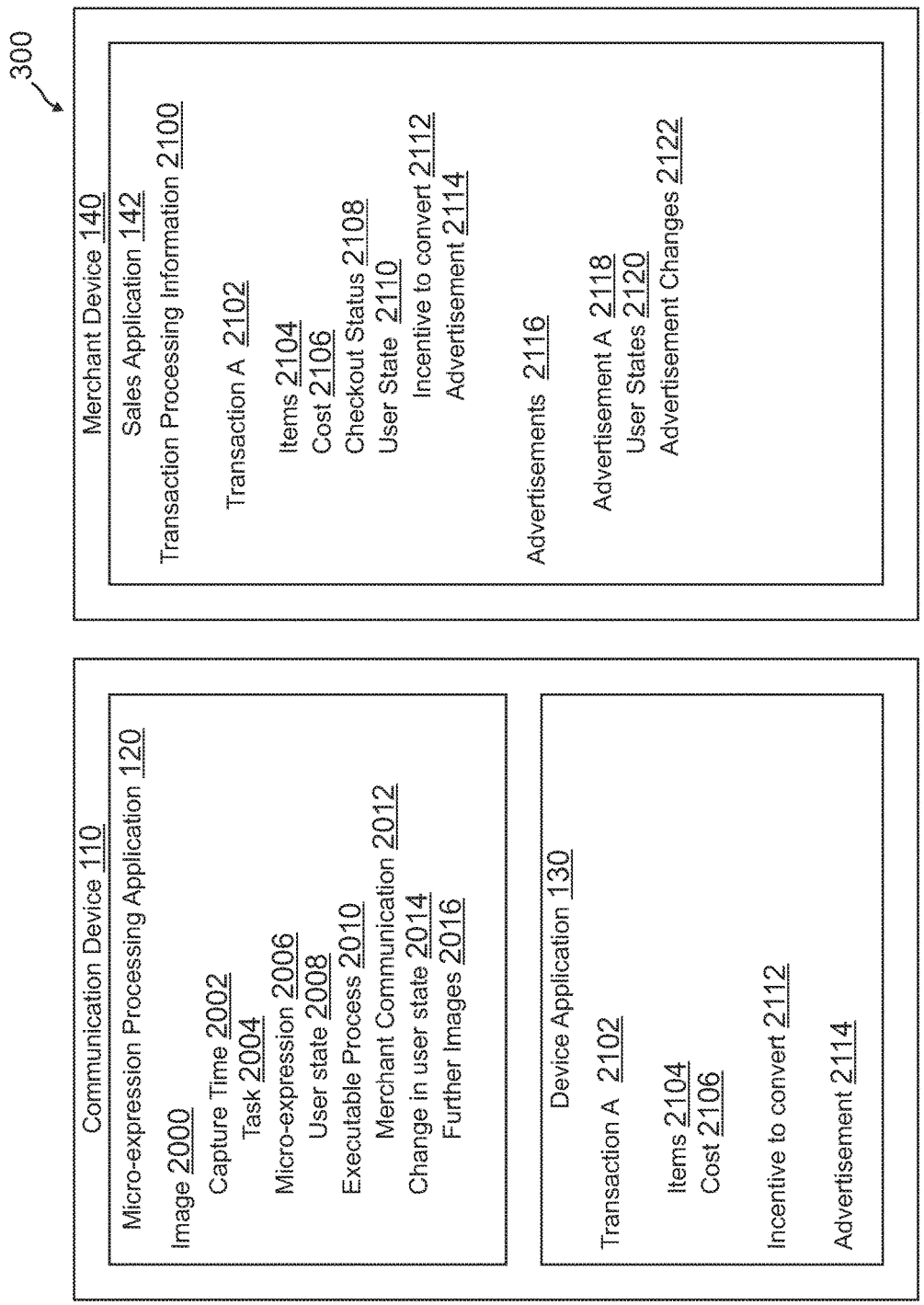
FIG. 3 is an exemplary system environment showing a communication device interacting with a service provider for image data detection for micro-expression analysis and targeted data services, according to an embodiment.

FIG. 3 is an exemplary system environment showing a communication device interacting with a service provider for image data detection for micro-expression analysis and targeted data services, according to an embodiment. FIG. 3 includes communication device 110 and merchant device 140 both discussed in reference to environment 100a of FIG. 1A.

Communication device 110 executes micro-expression processing application 120 corresponding generally to the specialized hardware and/or software modules and processes described in reference to FIG. 1A. In this regard, micro-expression processing application 120 may be utilized to process an image in order to determine a micro-expression by the user in the image, and an associated user state with the micro-expression. In this regard, micro-expression processing application 120 includes an image 2000, where image 2000 is associated with a capture time 2002, such as a task 2004 by the user associated with communication device 110 at capture time 2002. Additionally, image 2000 is processed to determine a micro-expression 2006. Based on stored micro-expressions have associated user states, a user state 2008 may be determined. Moreover, based on user state 2008, micro-expression processing application 120 may determine an executable process in response to user state 2008, such as a merchant communication 2012, where user state 2008 may be based on information in device application 130. Additionally, micro-expression processing application 120 may further include a change in user state 2014, which may be determined from further images 2016 of the user.

Merchant device 140 executes sales application 142 corresponding generally to the specialized hardware and/or software modules and processes described in reference to FIG. 1A. In this regard, sales application 142 may receive a user state during a transaction and provide information to a user associated with the user state to convert the user during the transaction. Thus, sales application 142 includes transaction processing information 2100. For example, transaction processing information 2100 includes a transaction A 2102 between the user associated with communication device 110 and the merchant associated with merchant device 140. Transaction A 2102 may include items 2104 and a cost 2106. Transaction A 2102 may include a checkout status 2108, such as a current status of the transaction and where the user associated with transaction A 2102 is at during transaction processing. Additionally, transaction A 2102 may be associated with user state 2008, where user state 2008 is used to determine an incentive to convert 2112 and an advertisement 2114. In various embodiments, the incentive may instead correspond to an upsell where the user is already converted and has purchased or will purchase an item, or where the upsell may convert the user. Thus, user state 2008 may be used to adjust advertisements 2116. For example, advertisement A 2118 may be associated with user states 2120 in response to advertisement A 2118, where user states 2120 are used to determine advertisement changes 2122.

Communication device 110 executes device application 130 corresponding generally to the specialized hardware and/or software modules and processes described in reference to FIG. 1A. In this regard, device application 130 may execute a process in response to user states, which may include receiving and displaying information from merchant device 140, where sales application 142 of merchant device 140 provide information to convert a user in a transaction in response to the users state. Thus, device application 130 includes transaction A 2102, which includes items 2104 and costs 2106. Additionally device application 130 may include displayable information for incentive to convert 2112 and advertisement 2114. Thus, such displayable information may be utilized in device application 130 to attempt to convert the user associated with communication device 110.

Figure 4:
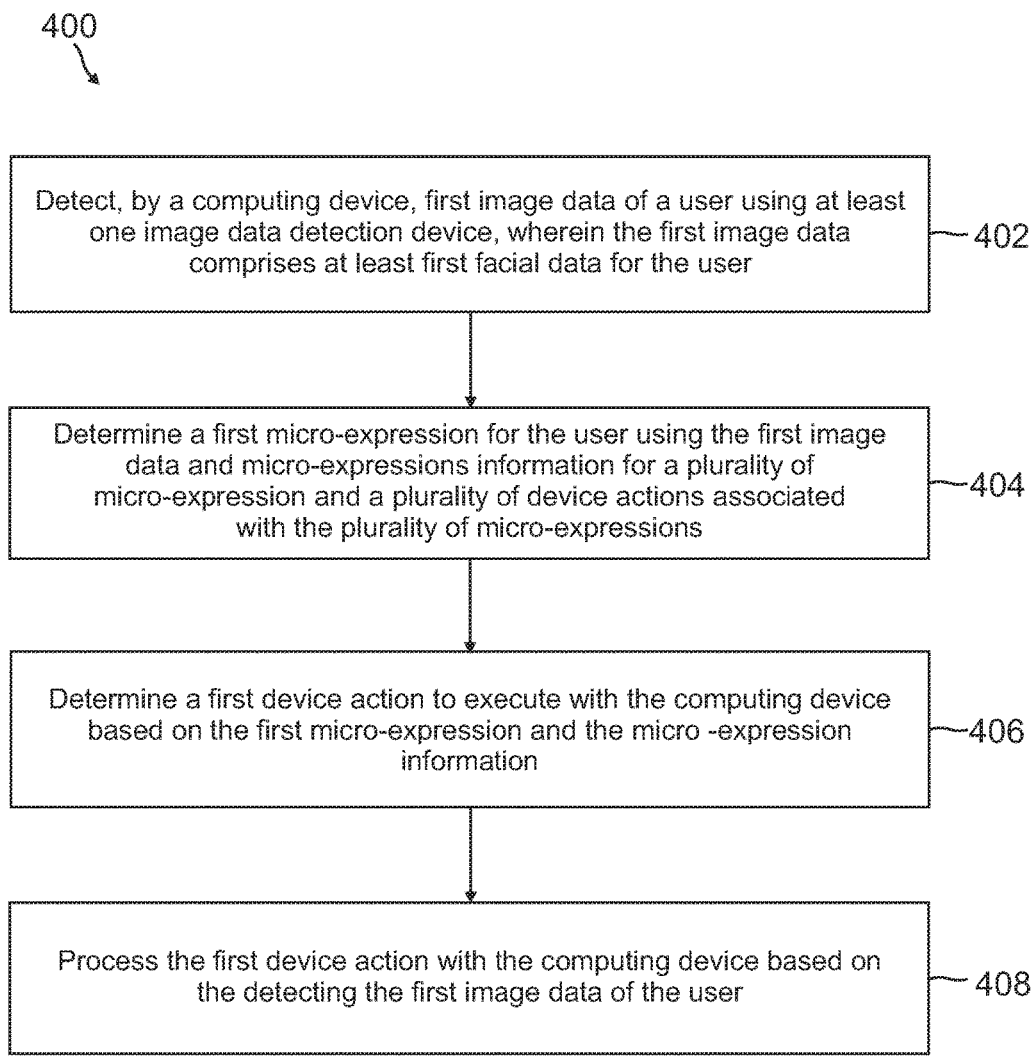
FIG. 4 is a flowchart of an exemplary process for image data detection for micro-expression analysis and targeted data services, according to an embodiment.

FIG. 4 is a flowchart of an exemplary process for image data detection for micro-expression analysis and targeted data services, according to an embodiment. Note that one or more steps, processes, and methods described herein may be omitted, performed in a different sequence, or combined as desired or appropriate.

At step 402, a first image data of a user is detected by a computing device using at least one image data detection device, wherein the first image data comprises at least first facial data for the user. The at least one image data detection device may comprise at least one of a camera, an infrared sensor, a motion detection device, and a photodetector. The image data may be determined from an image, wherein the image is taken from a plurality of images captured by the communication device, and wherein the plurality of images comprises a video of the user. The image data may further comprise body data for a body of the user.

At step 406, a first micro-expression for the user is determined using the first image data and micro-expression information for a plurality of micro-expressions and a plurality of device actions associated with the plurality of micro-expressions. Additionally, the user may be identified using the first image data, wherein the determining the first micro-expression is particular to the user. Additionally, a nationality of the user may be determined using the image, wherein the micro-expression of the user is further determined using the nationality. For example, location information for the user may be received from the communication device, wherein the nationality is further determined using the location information.

A first device action to execute with the computing device based on the first micro-expression and the micro-expression information, at step 408. In various embodiments, prior to determining the first device action, one or more first user states for the user may be determined from the first micro-expression, where the first device action depends on the one or more user states for the user. In various embodiments, the first micro-expression may indicate the user is inebriated, wherein the first device action comprises requesting additional authentication from the user for at least one of sending communications using the computing device, purchasing items through the computing device, posting to a social networking service using the computing device, and posting to a microblogging service using the computing device.

At step 410, the first device action is processed with the computing device based on the detecting the first image data of the user. In various embodiments, the image of the user is captured during the user taking a survey, wherein the processing the first action comprises one of adjusting the survey in response to the user state and determining a user response to a question in the survey based on the user state. In other embodiments, the processing the first action comprises communicating an advertisement for an item or additional information for the item to the communication device of the user. In still further embodiments, the image is captured by during an authentication request for the user on the communication device, wherein the user state comprises a response to an authentication query in the authentication request, and wherein the processing the first action comprises authenticating the user based on the response to the authentication query.

In further embodiments, second image data of the user is detected using the at least one image data detection device, wherein the second image data comprises at least second facial data for the user. Thus, a second micro-expression of the user is determined using the second image data and the micro-expression information and a second device action to execute with the computing device is determined using the second micro-expression, wherein the second device action updates the first device action. The second device action is then processed with the computing device based on the receiving the second image data of the user.

Additionally, the first or second action may be executed using a resource of the computing device. For example, the action may comprises an application process of an application executable by the computing device system, wherein the at least one resource comprises the application. Moreover, the micro-expression of the user may comprise a reaction by the user to a transaction between the user and a merchant, wherein the reaction indicates that the user does not pay for the transaction, and wherein the action comprises an alert to at least one of the merchant and a service provider, for example, using an application and/or communication interface resource. The at least one of the merchant and the service provider may then determine additional information for use in inducing the user to pay for the transaction based on the micro-expression and the user state, wherein the at least one of the merchant and the service provider communicates the additional information to the computing device system. The at least one of the merchant and the service provider may also adjust an advertisement for the transaction or a cost of items in the transaction based on the micro-expression and the user state. The merchant may adjust merchant data associated with the transaction based on the micro-expression and the user state. For example, the merchant may receive the reaction in real-time, and communicate a communication from a virtual salesperson associated with the merchant to the communication device, wherein the communication is directed to the transaction.

Figure 5:
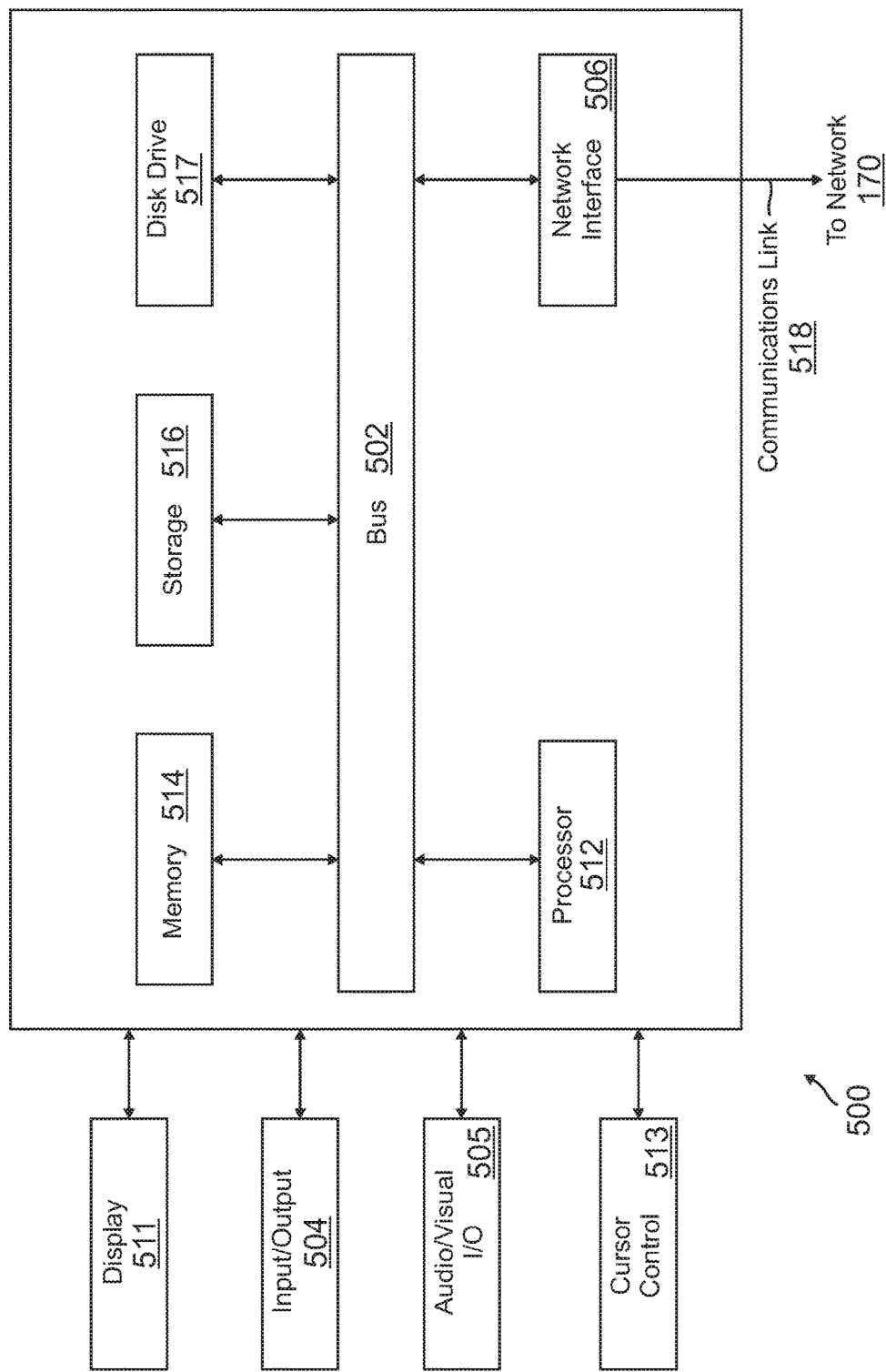
FIG. 5 is a block diagram of a computer system suitable for implementing one or more components in FIG. 1A, according to an embodiment.

FIG. 5 is a block diagram of a computer system suitable for implementing one or more components in FIG. 1A, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 170. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computing device system comprising:
    a non-transitory memory storing micro-expression information for a plurality of micro-expressions and a plurality of user states associated with the plurality of micro-expressions; and
    one or more hardware processors configured to execute instructions to cause the computing device system to perform operations comprising:
        accessing an image of a user using a camera of the computing device system, wherein the image comprises at least facial data for the user;
        determining a micro-expression for the user of the plurality of micro-expressions using the micro-expression information and the image;
        determining a user state for the user from the plurality of user states associated with the micro-expression, wherein the user state indicates the user is intoxicated;
        determining an action to execute with the computing device system based on the user state of the user, wherein the action comprises requiring additional authentication through at least one resource of the computing device system;
        processing the action with the at least one resource;
        requesting the additional authentication through the at least one resource;
        imposing a limitation on a device functionality on the computing device system prior to receiving the additional authentication; and
        in response to receiving the additional authentication, removing the limitation on the device functionality on the computing device system.

2. The computing device system of claim 1, wherein the image further comprises body data for a body of the user.

3. The computing device system of claim 1, wherein the action is associated with an application process of an application executable by the computing device system that requires the additional authentication, and wherein the at least one resource comprises the application.

4. The computing device system of claim 1, wherein the operations further comprise:
    communicating the user state to a merchant associated with a transaction between the user and the merchant; and
    receiving an update to the transaction from the merchant based on the user state.

5. The computing device system of claim 1, wherein the limitation comprises preventing access to at least one of a communication process of a messaging application, a social networking process of a social networking application, or an electronic transaction processing process of a payment application.

6. A method comprising:
    accessing, by a computing device, first image data of a user captured using at least one image data detection device, wherein the first image data comprises at least first facial data for the user;
    determining a first micro-expression for the user using the first image data and micro-expression information for a plurality of micro-expressions and a plurality of device actions associated with the plurality of micro-expressions, wherein the first micro-expression comprises a reaction by the user to a transaction between the user and a merchant, and wherein the reaction is associated with a user state requiring additional authentication for performing a device process with the computing device;
    determining, through an application on the computing device, a first device action to execute with the computing device based on the first micro-expression and the micro-expression information, wherein the first device action comprises an alert to one of the merchant or a service provider associated with the merchant, and wherein the alert indicates requiring the additional authentication from the user for the device process; and
    processing, through the application, the first device action with the computing device based on the detecting the first image data of the user, wherein the processing comprises:
        requesting the additional authentication through the application, and
        imposing a limitation on a device functionality associated with the device process on the computing device prior to receiving the additional authentication; and
    in response to receiving the additional authentication, removing the limitation on the device functionality on the computing device.

7. The method of claim 6, wherein the device process comprises one of sending communications using the computing device, purchasing items through the computing device, posting to a social networking service using the computing device, or posting to a microblogging service using the computing device.

8. The method of claim 6, further comprising:
    identifying the user using the first image data,
    wherein the determining the first micro-expression is particular to the user.

9. The method of claim 6, further comprising:
    determining content being viewed by the user corresponding to the first image data of the user,
    wherein the determining the first device action is further based on the content.

10. The method of claim 6, further comprising:
    detecting second image data of the user using the at least one image data detection device, wherein the second image data comprises at least second facial data for the user;
    determining a second micro-expression of the user using the second image data and the micro-expression information;
    determining, through the application, a second device action to execute with the computing device using the second micro-expression, wherein the second device action updates the first device action; and
    processing, through the application, the second device action with the computing device based on the detecting the second image data of the user.

11. The method of claim 6, further comprising:
determining a reaction by the user to a transaction between the user and a merchant based on one of the first micro-expression or a second micro-expression; and
transmitting the alert to one of the merchant or a service provider associated with the transaction based on the reaction.

12. The method of claim 11, further comprising:
receiving additional information comprising an incentive for the user to complete the transaction based on the reaction from the one of the merchant or the service provider.

13. The method of claim 11, further comprising:
receiving an adjustment to an advertisement for the transaction or a cost of items in the transaction based on the reaction.

14. The method of claim 11, further comprising:
transmitting the reaction to the transaction to the merchant in real-time; and
receiving a communication from a virtual salesperson associated with the merchant, wherein the communication is directed to the transaction.

15. A service provider system comprising:
a non-transitory memory storing micro-expression information for a plurality of micro-expressions and a plurality of user states associated with the plurality of micro-expressions; and
one or more hardware processors configured to execute instructions to cause the service provider system to perform operations comprising:
receiving an image of a user obtained via a communication device of the user, wherein the image of the user comprises a representation of the user;
determining facial data of the user from the image of the user;
determining a micro-expression of the user from the facial data and the micro-expression information, wherein the micro-expression corresponds to a current state of the user at a time of capture of the image;
determining a user state for the user of the plurality of user states based on the micro-expression of the user in the image and the micro-expression information, wherein the user state comprises a state of mind for the user that requires additional authentication for performing a device process with the communication device;
determining content being viewed by the user corresponding to the image of the user;
processing an action for the user based on the user state and the content, wherein the action comprises requesting the additional authentication from the user; and
requesting the additional authentication from the user;
limiting an access to the device process on the communication device prior to receiving the additional authentication; and
in response to receiving the additional authentication, providing the access to the device process on the communication device.

16. The service provider system of claim 15, wherein the image is taken from a plurality of images captured by the communication device, and wherein the plurality of images comprises a video of the user.

17. The service provider system of claim 15, wherein the processing the action comprises communicating an advertisement for an item or additional information for the item to the communication device of the user.

18. The service provider system of claim 15, wherein the image is captured by during an authentication request for the user on the communication device, and wherein the user state comprises a response to an authentication query in the authentication request.

19. The service provider system of claim 15, wherein the operations further comprise:
determining a nationality of the user using the image, wherein the micro-expression of the user is further determined using the nationality.

20. The service provider system of claim 15, wherein the action further comprises preventing the user from performing the device process without the additional authentication.

* * * * *